(12) United States Patent
Fang et al.

(10) Patent No.: US 9,109,901 B2
(45) Date of Patent: Aug. 18, 2015

(54) SYSTEM AND METHOD FOR MONITORING A GYROSCOPE

(71) Applicant: Freescale Semiconductor, Inc., Austin, TX (US)

(72) Inventors: Deyou Fang, Chandler, AZ (US); Keith L. Kraver, Gilbert, AZ (US); Mark E. Schlarmann, Chandler, AZ (US)

(73) Assignee: FREESCALE SEMICONDUCTOR INC., Austin, TX (US)

( * ) Notice: Subject to any disclaimer, the term of this patent is extended or adjusted under 35 U.S.C. 154(b) by 392 days.

(21) Appl. No.: 13/790,717

(22) Filed: Mar. 8, 2013

(65) Prior Publication Data

US 2014/0250970 A1    Sep. 11, 2014

(51) Int. Cl.
   *G01P 21/00* (2006.01)
   *G01C 25/00* (2006.01)

(52) U.S. Cl.
   CPC .................... *G01C 25/005* (2013.01)

(58) Field of Classification Search
   CPC ....... G01P 21/00; G01P 21/02; G01C 25/005; G01C 19/56
   USPC ......................................... 73/1.37
   See application file for complete search history.

(56) References Cited

U.S. PATENT DOCUMENTS

| 6,101,864 | A | 8/2000 | Abrams et al. |
|---|---|---|---|
| 7,980,135 | B2 | 7/2011 | Prandi et al. |
| 8,156,805 | B2 | 4/2012 | Hayner et al. |
| 2011/0146402 | A1 | 6/2011 | Donadel et al. |
| 2011/0192226 | A1 | 8/2011 | Hayner et al. |
| 2013/0283908 | A1* | 10/2013 | Geen et al. .................. 73/504.12 |
| 2014/0013845 | A1* | 1/2014 | Stewart et al. ............. 73/504.12 |

OTHER PUBLICATIONS

Costlow, Lynn E.,"A MEMS Gyro for the Harsh Engine Compartment Environment", Apr. 1, 2007, printed from http://www.sensorsmag.com/automotive/a-mems-gyro-harsh-engine-compartment-environment-1353 (5 pages).

* cited by examiner

*Primary Examiner* — Hezron E Williams
*Assistant Examiner* — Rodney T Frank
(74) *Attorney, Agent, or Firm* — Ingrassia Fisher & Lorenz, P.C.

(57) ABSTRACT

Systems and methods are provided for monitoring operation of MEMS gyroscopes (110). A test signal generator (124) is configured to generate and apply a test signal to the rate feedback loop (112) of a MEMS gyroscope (110). A test signal detector (126) is coupled to the quadrature feedback loop (114) of the MEMS gyroscope (110) and is configured to receive a quadrature output signal from the quadrature feedback loop (114). The test signal detector (126) demodulates the quadrature output signal to detect effects of the test signal. Finally, the test signal detector (126) is configured to generate a monitor output indicative of the operation of the sensing device based at least in part on the detected effects of the test signal in the quadrature output signal. Thus, the system is able to provide for the continuous monitoring of the operation of the MEMS gyroscope (110).

20 Claims, 4 Drawing Sheets

SYSTEM AND METHOD FOR MONITORING A GYROSCOPE

TECHNICAL FIELD OF THE INVENTION

The present invention relates generally to microelectromechanical systems (MEMS) devices. More specifically, the present invention relates to monitoring MEMS gyroscope operation.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems.

One example of a MEMS sensor is a MEMS gyroscope. Alternatively referred to as an "angular rate sensor," "gyroscope," "gyrometer," "vibratory gyroscopes," "gyroscope sensor," or "yaw-pitch-roll rate sensor," an angular rate sensor senses angular speed or velocity around one or more axes. MEMS gyroscopes are widely used in a variety of sensing applications. For example, vehicle or automotive applications may use MEMS gyroscopes, to determine when to deploy the vehicle airbag or activate a stability and/or fraction control system. In addition, consumer electronics devices, such as video game controllers, personal media players, cell phones, and digital cameras, also use MEMS gyroscopes in various applications to detect the orientation and/or respond to rotational movement of the device.

BRIEF DESCRIPTION OF THE DRAWINGS

A more complete understanding of the present invention may be derived by referring to the detailed description and claims when considered in connection with the Figures. It should be noted that these figures are not necessarily drawn to scale, and that in these figures like reference numbers refer to similar items throughout the Figures, and:

DETAILED DESCRIPTION

Figure 1:
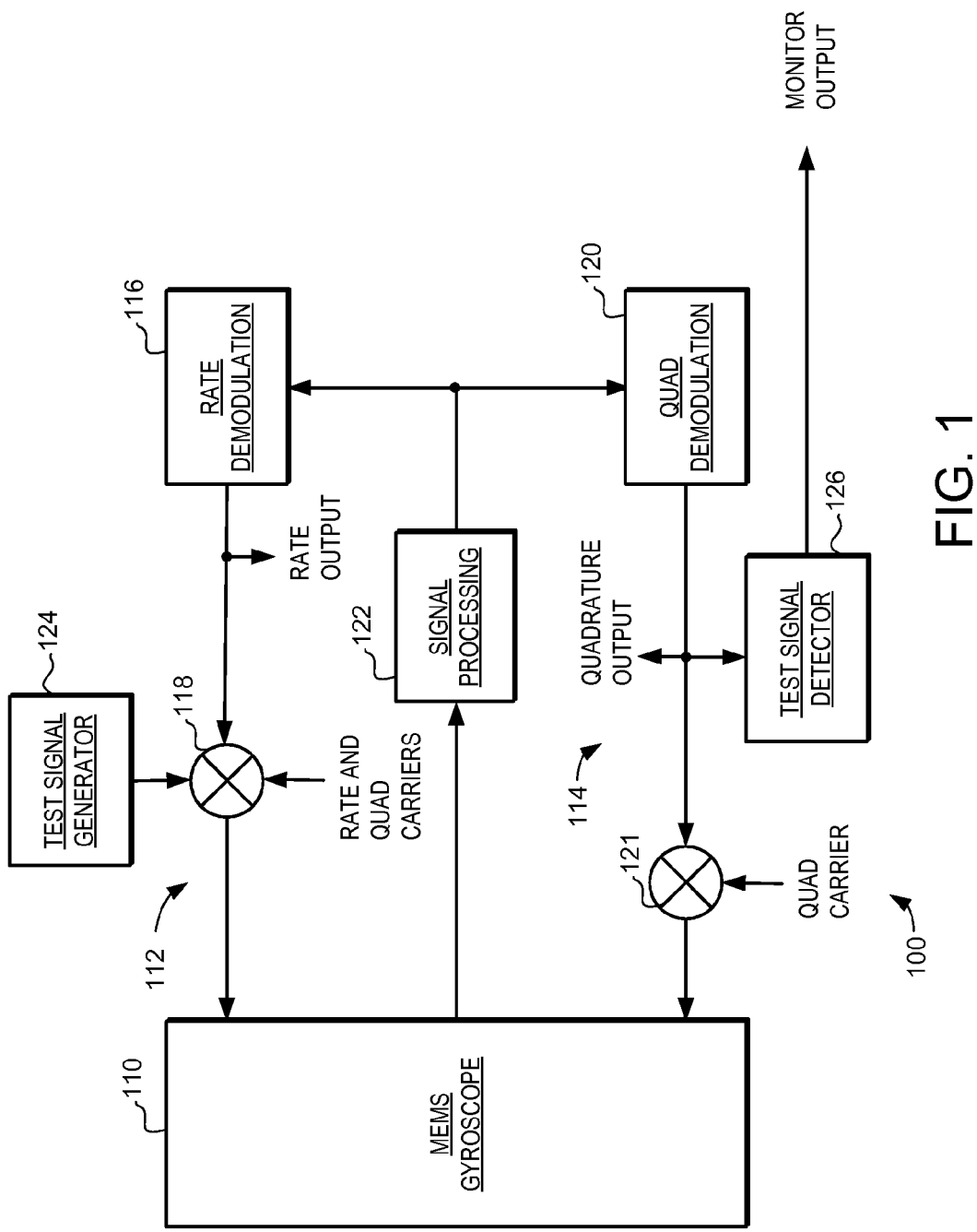
FIG. 1 is a schematic view of a sensing portion of a MEMS gyroscope with monitoring in accordance with an embodiment of the invention.

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

The following description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter.

For the sake of brevity, conventional techniques related to microelectromechanical systems (MEMS) fabrication and development, MEMS sensing, analog circuit design, and other functional aspects of the systems (and the individual operating components of the systems) may not be described in detail herein. Furthermore, the connecting lines shown in the various figures contained herein are intended to represent functional relationships and/or physical couplings between the various elements. It should be noted that many alternative or additional functional relationships or physical connections may be present in an embodiment of the subject matter. It should be understood that circuitry described herein may be implemented either in silicon or another semiconductor material or alternatively by code representation thereof. In addition, certain terminology may also be used in the following description for the purpose of reference only, and thus are not intended to be limiting, and the terms "first," "second" and other such numerical terms referring to structures do not imply a sequence or order unless clearly indicated by the context.

The various embodiments described herein provide systems and methods for monitoring operation of a sensing device, and in particular, for monitoring operation of MEMS gyroscopes. In these embodiments a rate feedback loop and a quadrature feedback loop are coupled to the MEMS gyroscope. A test signal generator and test signal detector is provided. The test signal generator is configured to generate a test signal and apply the test signal to the rate feedback loop of the MEMS gyroscope. The test signal detector is coupled to the quadrature feedback loop of the MEMS gyroscope and is configured to receive a quadrature output signal from the quadrature feedback loop. The test signal detector demodulates the quadrature output signal to detect effects of the test signal. Finally, the test signal detector is configured to generate a monitor output indicative of the operation of the sensing device based at least in part on the detected effects of the test signal in the quadrature output signal. Thus, the system is able to provide for the continuous monitoring of the operation of the MEMS gyroscope.

Specifically, the monitor output signal can be used to continuously verify that the MEMS gyroscope is functioning properly and providing good data. This self-monitoring can cover virtually the entire system, and in particular the signal processing, feedback loops, and output circuits in the MEMS gyroscope. This monitoring can provide a continuous check on the operation of the MEMS gyroscope, and thus can be used to self-monitor virtually the entire system.

Such a system for monitoring the operation of the MEMS gyroscope can add to overall system reliability for those devices and systems that use MEMS gyroscopes. For example, in vehicle stability control applications where MEMS gyroscopes are used to determine when active stability control needs to be activated. In such systems the self-monitoring provided by the various embodiments provides the ability to better insure proper function of the vehicle stability control and thus can better handle the harsh and hostile environments commonly found in motor vehicles.

Typical MEMS gyroscopes employ a small vibrating mass (sometimes referred to as a drive mass) which is driven to resonate within a two-dimensional plane, i.e., the plane of oscillation. When the plane of oscillation is rotated, the Coriolis force causes the vibrating mass to be displaced from the plane of oscillation by an amount proportional to the rate of rotation. In order to determine the rate of rotation, this displacement is measured and converted into an electrical signal which oscillates with the same resonant frequency as the vibrating mass. An in-phase component of this electrical signal is proportional to the rate of rotation, and is generally referred to as the rate signal or rate component.

One issue with typical MEMS gyroscopes is the existence of undesirable interference signals, commonly referred to as a quadrature component or quadrature error. Quadrature error typically occurs in MEMS gyroscopes due to manufacturing imperfections that cause the drive oscillation to induce motion in the sense mass. This creates an oscillation about the sense axis that can be confused with Coriolis acceleration and subsequently, the rotation rate. Unfortunately, such a quadrature error can result in offset error, reduced dynamic range, and increased noise for the device. A large quadrature error can even cause a device to rail so that the sense mass comes into contact with conductive electrodes potentially resulting in collision-related damage, such as a short.

Such a quadrature error may be manifest as an quadrature component error signal. This quadrature component is phase shifted 90 degrees relative to the in-phase rate signal. In order to determine the rate of rotation some MEMS gyroscopes demodulate the electrical signal using a carrier signal at the resonant frequency into an in-phase component and a quadrature component.

Furthermore, some MEMS gyroscope systems use closed-loop control systems that apply the in-phase and quadrature components to the vibrating mass after modulating carriers of appropriate frequencies and phases to counter the displacement caused by the rotation and reduce the errors associated with quadrature motion. To accomplish this the MEMS gyroscope uses both a rate feedback loop and a quadrature feedback loop, with the rate feedback loop used to apply the in-phase or rate information to the vibrating mass and the quadrature feedback loop used to apply the quadrature information to the vibrating mass. In accordance with the embodiments described herein these same feedback loops are used for monitoring of the MEMS gyroscope. Specifically, the test signal generator is configured to generate a test signal and apply the test signal to the rate feedback loop. Likewise, the test signal detector is coupled to the quadrature feedback loop of the MEMS gyroscope and is configured to receive a quadrature output signal from the quadrature feedback loop. The test signal detector demodulates the quadrature output signal to detect effects of the test signal in the quadrature feedback loop.

Turning now to FIG. 1, a simplified schematic view of a sensing device 100 that includes a MEMS gyroscope 110 with self-monitoring is illustrated. In one embodiment the MEMS gyroscope 110 comprises a rate gyroscope that generates an output that is proportional to the rate of measured rotation. However, in other embodiments the MEMS gyroscope 110 could comprise a whole angle gyroscope. The MEMS gyroscope 110 is coupled to a rate feedback loop 112 and a quadrature feedback loop 114. In this simplified example, the rate feedback loop 112 includes rate demodulation block 116, and a mixer 118, and the quadrature feedback loop 114 includes a quadrature demodulation block 120 and mixer 121. The rate demodulation block 116 receives an output from signal processing 122 and demodulates the signal to generate a rate output signal. The rate output signal modulates the rate carrier at mixer 118, and the resulting rate feedback signal is fed back to the MEMS gyroscope 110. Likewise, the quadrature demodulation block 120 receives the output from signal processing 122 and demodulates the signal to generate a quadrature output signal. The quadrature output signal modulates the quadrature carrier at mixer 121, and the resulting quadrature feedback signal is fed back to the MEMS gyroscope 110. Again, it should be noted that FIG. 1 is a conceptual illustration, and thus does not illustrate all the elements of a typical implementation. For example, a typical implementation would include additional signal processing elements in each of the feedback loops.

The rate feedback signal at the output of mixer 118 has a component that is in phase with the velocity of the vibrating mass while the quadrature feedback signal at the output of mixer 121 has a component that is in phase with the position or displacement of the vibrating mass. The quadrature feedback loop 114 allows this quadrature feedback signal to be fed back to the MEMS gyroscope 110 where it can be used to cancel out quadrature motion in the vibrating mass.

In accordance with the embodiments described herein, a test signal generator 124 and test signal detector 126 is provided. The test signal generator 124 is configured to generate a test signal and apply the test signal to the rate feedback loop 112 of the MEMS gyroscope 110. In particular, the test signal generator 124 applies the test signal by using mixer 118 to modulate a quadrature-phase carrier by the test signal and adding the result to an in-phase carrier modulated by the rate output signal. The test signal detector 126 is coupled to the quadrature feedback loop 114 of the MEMS gyroscope 110 and is configured to receive a quadrature output signal from the quadrature feedback loop 114. The test signal detector 126 demodulates the quadrature output signal to detect effects of the test signal in the quadrature output. Finally, the test signal detector 126 is configured to generate a monitor output indicative of the operation of the sensing device based at least in part on the detected effects of the test signal.

The monitor output provides indication of the operation of the system, and thus provides self-monitoring that verifies that the MEMS gyroscope is functioning properly and providing good data. Furthermore, because the test signal is injected into the rate feedback loop 112, which is then fed back into the MEMS gyroscope 110, then finally detected from quadrature feedback loop 114, this self-monitoring provides an indication of health that can cover virtually the entire system. In particular, the monitoring can provide an indication of the heath and operation of the MEMS gyroscope 110, signal processing 122, the feedback loops 112 and 114, and the demodulation blocks 116 and 120. Furthermore, because test signal is injected in the rate feedback loop 112 and detected in the quadrature feedback loop 114 during normal operation this monitoring can provide a continuous check on the operation of the MEMS gyroscope 110 and associated components. Thus, the system is able to provide for the continuous monitoring of the operation of the MEMS gyroscope 110 without interfering with the operation of the MEMS gyroscope 110.

In general, the test signal generator 124 is configured to generate a test signal that can be injected into the rate feedback loop without interfering with the normal operation of the MEMS gyroscope 110. Furthermore, it is desirable to use a test signal that is relatively immune to being mimicked by naturally occurring sources of interference. For this reason the test signal generator can be configured to generate a modulated test signal. In one specific example, the test signal generator 124 generates a square wave using a modulation technique for use as the test signal.

Furthermore, the test signal generator 124 can be configured to generate the test signal with a carrier that is in quadrature phase to the carrier on the rate feedback signal. In this case the test signal is generated to be in phase with the quadrature feedback signal while being injected in the rate feedback loop. By injecting the test signal in the quadrature phase, the processed test signal appears at the output of the quadrature loop while the quadrature feedback loop generates a signal to cancel the injected test tone. In this way both the rate and quadrature electrodes are monitored and the test signal does not corrupt the rate output signal.

In one further variation the test signal generator 124 is additionally configured to control the amplitude of the test signal. For example, the test signal generator 124 can be configured to modulate the amplitude of the test signal. As will be described in greater detail below, the test signal detector 126 can be configured to detect the amplitude of the of the test signal demodulated from the quadrature output signal. From this, the drive amplitude of the MEMS gyroscope 110 can be determined. Specifically, in a typical implementation of this embodiment the quadrature-phase carrier for the rate feedback has a fixed amplitude while the quadrature-phase carrier for the quadrature feedback has an amplitude that is dependent on the drive amplitude. Therefore, the amplitude of the signal generated by the quadrature feedback loop to cancel the injected test signal will be larger if the drive amplitude is low and lower if the drive amplitude is high. Thus, by detecting the amplitude of the of the test signal demodulated from the quadrature output signal the drive amplitude can be determined.

Figure 2:
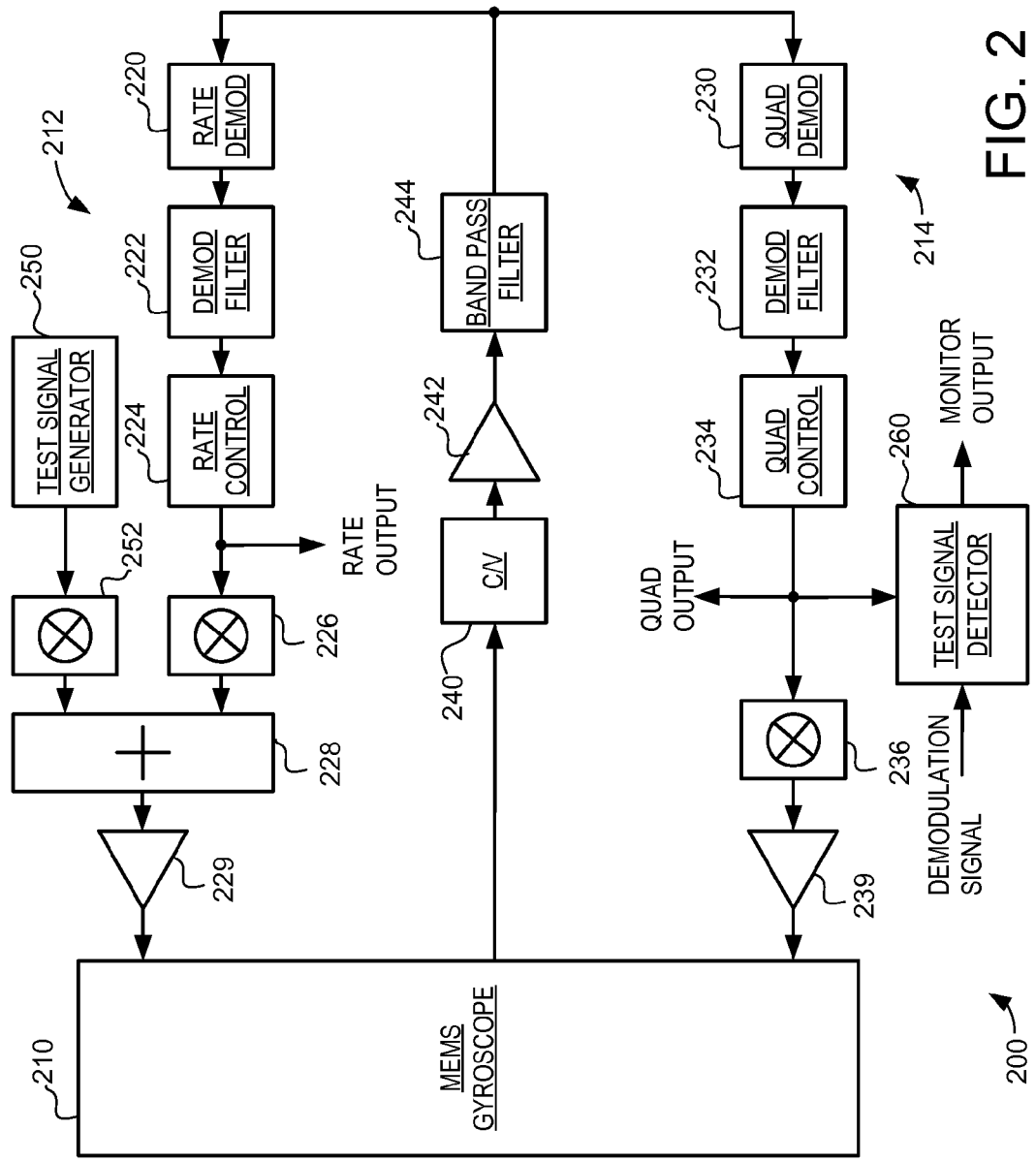
FIG. 2 is a schematic view of a sensing portion of a MEMS gyroscope with monitoring in accordance with an embodiment of the invention.

Turning now to FIG. 2, a schematic view of sensing device 200 that includes a MEMS gyroscope 210 with self-monitoring is illustrated. The MEMS gyroscope 210 is coupled to a rate feedback loop 212 and a quadrature feedback loop 214. In this example, the rate feedback loop 212 includes a rate demodulator 220, a rate demodulator filter 222, a rate control block 224, mixer 226, summer 228 and amplifier 229. The quadrature feedback loop 214 likewise includes a quadrature demodulator 230, a quadrature demodulator filter 232, a quadrature control block 234, mixer 236 and an amplifier 239. Also included in both feedback loops are a capacitance-to-voltage (C/V) converter 240, amplifier 242 and band-pass filter 244. During operation of the sensing device 200, a mass in the MEMS gyroscope 210 is driven to oscillate, and when the plane of oscillation is rotated, the Coriolis force causes the vibrating mass to be displaced from the plane of oscillation by an amount proportional to the rate of rotation. This displacement causes a change in capacitance, which is converted by C/V converter 240 to electrical signal that oscillates with the same resonant frequency as the vibrating mass. An in-phase component of this electrical signal is proportional to the rate of rotation, and is again generally referred to as the rate signal or rate component. A quadrature component of this electrical signal is proportional to the orthogonal motion, and is generally again referred to as the quadrature component or quadrature signal.

This electrical signal, including both in-phase and quadrature components, is amplified by amplifier 242 and filtered by band-pass filter 244. The resulting signal is passed to the rate feedback loop 212 and the quadrature feedback loop 214. In the rate feedback loop 212 the rate demodulator 220 demodulates the signal to extract the rate component, which is then passed to the rate demodulation filter 222 and rate control block 224. The demodulation filter 222 removes extraneous components generated by the demodulator (typically operating as a low-pass filter) and rate control block 224 implements a desired control law, e.g. a PID controller. This results in the generation of the rate output signal. Again, this rate output signal is proportional to the rotation rate as measured by the vibrating mass in the MEMS gyroscope 210, and can be used to generate an output of the gyroscope.

In addition to providing a measure of rotation, the rate output signal modulates an in-phase carrier using mixer 226, is summed with the test signal using summer 228, amplified by amplifier 229 and fed back into the MEMS gyroscope 210 as the rate feedback signal. It should be noted that the output of amplifier 229 contains both rate information and the test signal. By feeding back the rate information to the sensor at with the proper phase, the in-phase motion of the MEMS gyroscope is ideally cancelled. Furthermore, because the phase of the test signal at the output of amplifier 229 is in quadrature phase (90 phase offset from the rate information) the quadrature loop 214 compensates to cancel the resulting quadrature-phase motion of the MEMS gyroscope.

In the quadrature feedback loop 214 the quadrature demodulator 230 demodulates the signal to extract the quadrature component, which is then passed to the quadrature demodulation filter 232 and quadrature control block 234. The quadrature demodulation filter 232 removes extraneous components generated by the demodulator (typically operating as a low-pass filter) and quadrature control block 234 implements a desired control law, e.g. a PID controller. This results in the generation of the quadrature output signal. This quadrature output signal modulates an quadrature-phase carrier using mixer 236, amplified by amplifier 239 and fed back into the MEMS gyroscope 210 as the quadrature feedback signal, where the quadrature feedback signal is used to cancel the natural quadrature motion of the MEMS gyro and the quadrature motion resulting from the test signal injection.

In one variation on this embodiment the system is implemented without mixer 236 if the modulation is performed in the mechanical domain, where the vibrating mass is the quadrature-phase carrier.

In accordance with the embodiments described herein, the sensing device 200 also includes a test signal generator 250 and a test signal detector 260. The test signal generator 250 is configured to generate a test signal and apply the test signal to the rate feedback loop 212. In particular, the test signal modulates a quadrature-phase carrier using mixer 252 and is summed with rate component with summer 228, amplified by amplifier 239 and fed back into the MEMS gyroscope 210. As will be described in greater detail below, the modulated test signal outputted by mixer 252 is preferably configured to be in phase with quadrature components, and thus will not interfere with the in-phase rate components and can be detected in the quadrature feedback loop 214.

Specifically, the effects of the test signal being feedback into the MEMS gyroscope 210 are manifest in the vibrating mass, where they produce a corresponding change in capacitance, which is converted by C/V converter 240. Because the test signal is in phase with the quadrature component, the effects of the test signal are passed through the quadrature feedback loop 214 and are manifest in the quadrature output. The quadrature output is passed to the test signal detector 260. The test signal detector 260 demodulates the quadrature output to detect effects of the test signal in the output signal. Finally, the test signal detector 260 is configured to generate a monitor output indicative of the operation of the sensing device based at least in part on the detected effects of the test signal.

The monitor output provides indication of the operation of the system, and thus provides self-monitoring that verifies that the MEMS gyroscope 210 is functioning properly and providing good data. Furthermore, because the test signal is injected into the rate side and then finally detected in the quadrature side, this self-monitoring provides an indication of health that can cover virtually the entire sensing system. Furthermore, because test signal is injected in the rate feedback loop 212 and detected in the quadrature feedback loop 214 during normal operation this monitoring can provide a continuous check on the operation of the MEMS gyroscope 210 and associated components.

Figure 3:
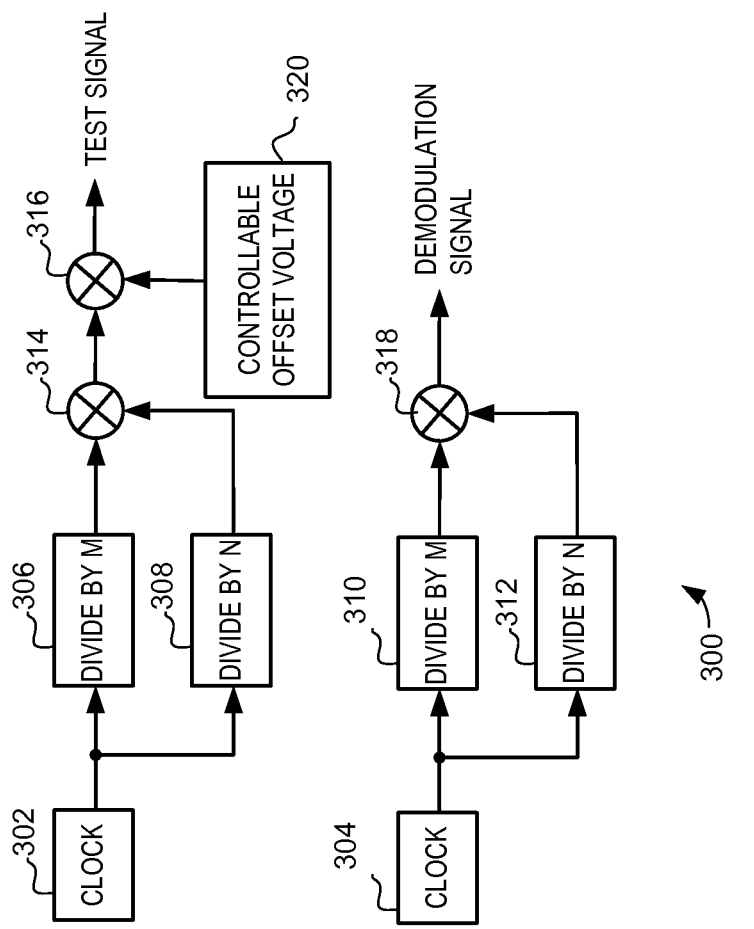
FIG. 3 is a schematic view of a test signal generator in accordance with an embodiment of the invention.

Turning now to FIG. 3, an exemplary test signal generator 300 is illustrated. In general, the test signal generator 300 is configured to generate a test signal that can be injected into the rate feedback loop without interfering with the normal operation of a MEMS gyroscope. Furthermore, in this embodiment the test signal generator 300 is also configured to generate a demodulation signal that can be used to demodulate the test signal from the quadrature output signal. In this embodiment the generated demodulation signal is functionally equivalent to the test signal yet independently generated. Because the demodulation signal is equivalent to the test signal the demodulation signal can be used to demodulate quadrature output signal and detect the test signal.

In the embodiment of FIG. 3, the test signal generator includes a first clock 302, a second clock 304, dividers 306, 308, 310, and 312, mixers 314, 316 and 318, and controllable offset voltage 320. In general, the clock 302 provides an input to dividers 306 and 308 which divide the clock signal by M and N respectively, and the resulting divided clock signals are XORed together by mixer 314. Likewise, the clock 304 provides an input to dividers 310 and 312 which divide the clock signal by M and N, and the resulting divided clock signals are XORed together by mixer 318. In each case the result is a modulated square wave that is not likely to be mimicked by naturally occurring sources of interference. And because the same procedure is used to generate both the test signal and the demodulation signal, the demodulation signal can be used to demodulate the test signal from the quadrature output signal.

The controllable offset voltage 320 and mixer 316 are provided to facilitate control of the amplitude of the test signal. As will be described in greater detail below, the test signal detector can be configured to measure the amplitude of the of the test signal demodulated from the quadrature output signal. From this, the performance of the drive amplitude of the MEMS gyroscope 110 can be determined.

As noted above, the test signal generator 300 is also configured to generate a demodulation signal that can be used to demodulate the test signal from the quadrature output signal. In the illustrated embodiment the demodulation signal is generated independently of the test signal. This reduces the probability of an undetectable failure in the test system. Specifically, because the test signal and the demodulation signal are generated independently it is less likely that they will both fail at the same time. This reduces the probability that the failure of the test signal generator to generate the test signal will be interpreted as evidence of that system is operating correctly.

Finally, it should be noted that the test signal generator 300 is just one example of the type of test signal generator that can be used. As another example, a square wave clock and DC signal can be used to provide an amplitude modulated square wave having a constant frequency. Such a relatively simple amplitude modulated square wave can be used as a test signal where interference is less likely to be an issue, and thus the need for a modulated square wave like that produced using the two dividers of FIG. 3 is not required.

Figure 4:
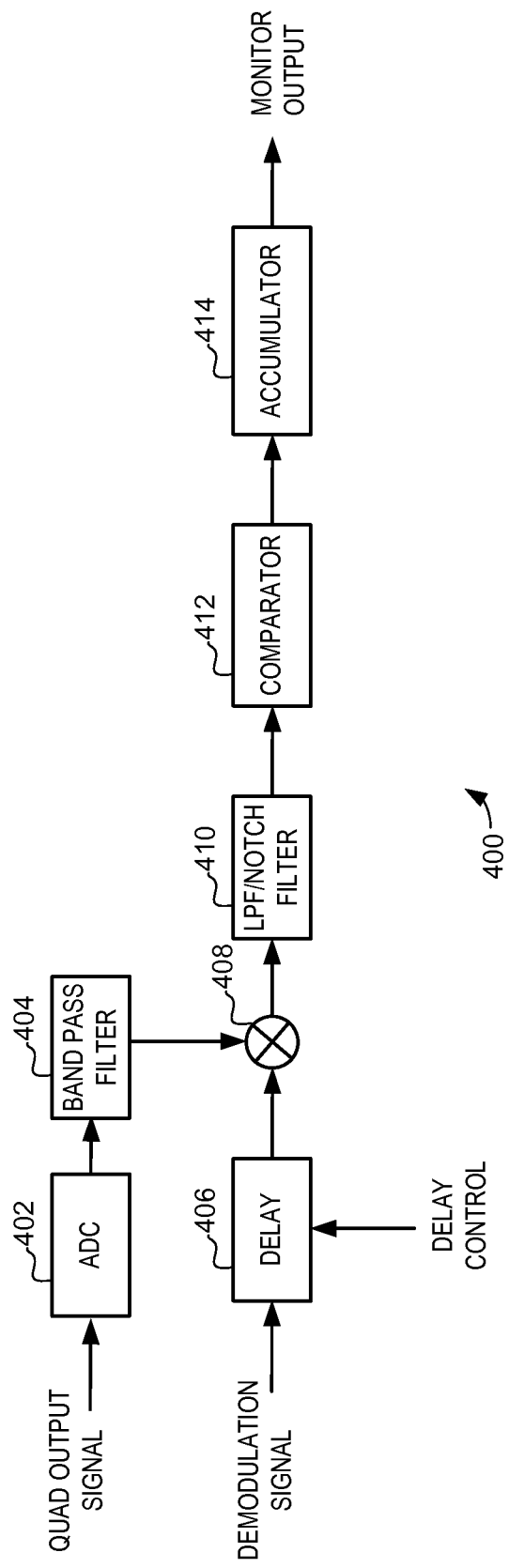
FIG. 4 is a schematic view of a test signal detector in accordance with an embodiment of the invention.

Turning now to FIG. 4, an exemplary test signal detector 400 is illustrated. In general, the test signal detector 400 is configured to demodulate the quadrature output to detect effects of the test signal in the quadrature output signal. Furthermore, the test signal detector 400 is configured to generate a monitor output indicative of the operation of the sensing device based at least in part on the detected effects of the test signal. In this case, it does so by continuously assessing whether the demodulated quadrature output is greater than a specified threshold and then filtering this comparison result with an accumulator. The test signal detector 400 includes an analog-to-digital converter (ADC) 402, a band pass filter 404, a controllable delay 406, a mixer 408, a LPF/notch filter 410, a comparator 412 and an accumulator 414. The ADC 402 receives the quadrature output signal from the quadrature feedback loop and converts that to a digital signal. The band pass filter 404 filters the converted signal to properly condition the signal for demodulation. The controllable delay 406 receives the demodulation signal from the test signal generator and delays the signal by a controllable amount to equal the delay that occurred in the path taken by the test signal. This controllable delay thus allows the demodulation signal to be used by mixer 408 to demodulate the converted quadrature output signal and extract any test signal that may be present.

A test signal present prior to the mixer 408 is translated in frequency to DC by said mixer and the demodulation process and is passed to the LPF/notch filter 410 that filters the test signal to remove any signals outside the test signal frequency. Specifically, LPF/notch filter 410 removes the generally large naturally-occurring quadrature component that has been translated to a higher frequency by mixer 408. With any test signal that was in the quadrature output signal extracted, the comparator 412 compares the remaining signal to a threshold to determine if test signal is present. An output indicating the result of the comparison is provided to the accumulator 414. The accumulator records these outputs, and provides a monitor output indicating the operation of the MEMS gyroscope.

As one example, the comparator 412 and accumulator 414 can be configured to only provide an indication of gyroscope failure when the comparator has failed to sense the test signal for a predetermined number of cycles. For example, the comparator 412 can be implemented to generate an output pulse when the effects of the test signal are not properly detected. Then, the accumulator 514 can be implemented to count these pulses and only providing an indication of failure when the accumulated number of pulses reaches a second threshold value. This prevents the monitor output from generating an indication of sensor failure for only intermittent indications that the test signal was not present, and thus prevents the monitoring from incorrectly identifying the gyroscope as failed.

Of course, the test signal detector 400 is just one example of the type of device that can be used to detect the test signal in the quadrature output signal, and other detecting devices could also be used. For example, in addition to detecting the effects of the test signal, the test signal detector can be configured to detect the amplitude of the of the test signal demodulated from the quadrature output signal. From this, the performance of the drive amplitude of the MEMS gyroscope 110 can be determined. As one specific example, the test signal can be demodulated to a baseband DC signal, and the DC signal gained with a "leaky" integrator, and the amplitude of the gained signal determined with a comparator. In this embodiment the comparator could contain multiple thresholds (multi-bit comparator) if more accuracy is required. In such an implementation the measure of the amplitude provided by the comparator is indication of how the system is operating. Thus, the output can be used to determine if parameters such as drive amplitude have shifted.

The various embodiments described herein thus provide systems and methods for monitoring operation of a sensing device, and in particular, for monitoring operation of MEMS gyroscopes. In these embodiments a test signal generator is configured to generate a test signal and apply the test signal to the rate feedback loop of a MEMS gyroscope. The test signal detector is coupled to the quadrature feedback loop of the MEMS gyroscope and is configured to receive a quadrature output signal from the quadrature feedback loop. The test signal detector demodulates the quadrature output signal to detect effects of the test signal. Finally, the test signal detector is configured to generate a monitor output indicative of the operation of the sensing device based at least in part on the detected effects of the test signal in the quadrature output signal. Thus, the system is able to provide for the continuous monitoring of the operation of the MEMS gyroscope.

In one embodiment, a system for monitoring operation of a sensing device is provided, where the sensing device includes microelectromechanical (MEMS) gyroscope, a rate feedback loop coupled to the MEMS gyroscope and a quadrature feedback loop coupled the MEMS gyroscope, the system comprising: a test signal generator, the test signal generator configured to generate a test signal and apply the test signal to the rate feedback loop during operation of the MEMS gyroscope; and a test signal detector, the test signal detector coupled to the quadrature feedback loop and configured to receive a quadrature output signal from the quadrature feedback loop and detect effects of the test signal, the test signal detector further configured to generate a monitor output indicative of the operation of the sensing device based at least in part on the detected effects of the test signal.

In another embodiment, a sensing device is provided, the sensing device comprising: a microelectromechanical (MEMS) gyroscope; a rate feedback loop coupled to the MEMS gyroscope, the rate feedback loop generating a rate output signal and feeding back a rate feedback signal to the MEMS gyroscope; a quadrature feedback loop coupled to the MEMS gyroscope, the quadrature feedback loop generating a quadrature output signal and feeding back a quadrature feedback signal to the MEMS gyroscope; a test signal generator, the test signal generator configured to generate a test signal and a demodulation signal, the test signal generated with a carrier in quadrature phase with respect to a phase of a carrier of the rate feedback signal, the test signal generator configured to apply the test signal to the rate feedback loop during operation of the sensing device; and a test signal detector, the test signal detector configured to receive the quadrature output signal from the quadrature feedback loop and demodulate the quadrature output signal using the demodulation signal to detect effects of the test signal, the test signal detector further configured to generate a monitor output indicative of the operation of the sensing device based at least in part on the detected effects of the test signal.

In another embodiment, a method of monitoring operation of a sensing device is provided, where the sensing device includes microelectromechanical (MEMS) gyroscope, a rate feedback loop coupled to the MEMS gyroscope and a quadrature feedback loop coupled the MEMS gyroscope, the method comprising: generating a test signal; applying the test signal to the rate feedback loop during operation of the MEMS gyroscope; receiving a quadrature output signal from the quadrature feedback loop; detecting effects of the test signal in the quadrature output signal; and generating a monitor output indicative of the operation of the sensing device based at least in part on the detected effects of the test signal.

Although the preferred embodiments of the invention have been illustrated and described in detail, it will be readily apparent to those skilled in the art that various modifications may be made therein without departing from the spirit of the invention or from the scope of the appended claims. Accordingly, it should be appreciated that the exemplary embodiments are only examples, and are not intended to limit the scope, applicability, or configuration of the invention.

What is claimed is:

1. A system for monitoring operation of a sensing device, where the sensing device includes microelectromechanical (MEMS) gyroscope, a rate feedback loop coupled to the MEMS gyroscope and a quadrature feedback loop coupled the MEMS gyroscope, the system comprising:
   a test signal generator, the test signal generator configured to generate a test signal and apply the test signal to the rate feedback loop during operation of the MEMS gyroscope; and
   a test signal detector, the test signal detector coupled to the quadrature feedback loop and configured to receive a quadrature output signal from the quadrature feedback loop and detect effects of the test signal in the quadrature output signal, the test signal detector further configured to generate a monitor output indicative of the operation of the sensing device based at least in part on the detected effects of the test signal.

2. The system of claim 1 wherein the test signal generator is coupled to the test signal detector to provide a demodulation signal to the test signal detector, where the demodulation signal is equivalent to the test signal, and wherein the test signal detector is configured to detect the effects of the test signal in the quadrature output signal by demodulating the quadrature output signal using the demodulation signal.

3. The system of claim 1 wherein the test signal generated by the test signal generator is a modulated signal.

4. The system of claim 1 wherein the test signal generated by the test signal generator is generated with a carrier in quadrature phase to a carrier on a rate feedback signal that is fed back to the MEMS gyroscope.

5. The system of claim 1 wherein the test signal generator combines square waves with different frequencies to generate the test signal.

6. The system of claim 1 wherein the test signal generator is additionally configured to set an amplitude of the test signal.

7. The system of claim 6 wherein the test signal detector is additionally configured to detect the amplitude of the detected test signal.

8. The system of claim 1 wherein the test signal detector is configured to detect the effects of the test signal in the quadrature output signal by demodulating the quadrature output signal using a demodulation signal received from the test signal generator.

9. The system of claim 8 wherein the test signal detector includes a comparator and an accumulator, and wherein the test signal detector compares the demodulated output signal to a threshold value using the comparator, and wherein the test signal detector accumulates an output of the comparator using the accumulator, and wherein the monitor output is generated based at least in part of the accumulated output of the comparator.

10. A sensing device, comprising:
    a microelectromechanical (MEMS) gyroscope;
    a rate feedback loop coupled to the MEMS gyroscope, the rate feedback loop generating a rate output signal and feeding back a rate feedback signal to the MEMS gyroscope;

a quadrature feedback loop coupled to the MEMS gyroscope, the quadrature feedback loop generating a quadrature output signal and feeding back a quadrature feedback signal to the MEMS gyroscope;

a test signal generator, the test signal generator configured to generate a test signal and a demodulation signal, the test signal generated with a carrier in quadrature phase with respect to a phase of a carrier of the rate feedback signal, the test signal generator configured to apply the test signal to the rate feedback loop during operation of the sensing device; and a test signal detector, the test signal detector configured to receive the quadrature output signal from the quadrature feedback loop and demodulate the quadrature output signal using the demodulation signal to detect effects of the test signal, the test signal detector further configured to generate a monitor output indicative of the operation of the sensing device based at least in part on the detected effects of the test signal.

11. The sensing device of claim 10 wherein the test signal generator combines square waves with different frequencies to generate the test signal.

12. The sensing device of claim 11 wherein the test signal detector is additionally configured to determine a measure of an amplitude of the detected effects of the test signal.

13. The sensing device of claim 10 wherein the test signal detector includes a comparator and an accumulator, and wherein the test signal detector detect effects of the test signal by comparing the demodulated output signal to a threshold value using the comparator, and wherein the test signal detector accumulates an output of the comparator using the accumulator, and wherein the monitor output is generated based at least in part of the accumulated output of the comparator.

14. A method of monitoring operation of a sensing device, where the sensing device includes microelectromechanical (MEMS) gyroscope, a rate feedback loop coupled to the MEMS gyroscope and a quadrature feedback loop coupled the MEMS gyroscope, the method comprising:

generating a test signal;

applying the test signal to the rate feedback loop during operation of the MEMS gyroscope;

receiving a quadrature output signal from the quadrature feedback loop;

detecting effects of the test signal in the quadrature output signal; and generating a monitor output indicative of the operation of the sensing device based at least in part on the detected effects of the test signal.

15. The method of claim 14 wherein the step of detecting effects of the test signal in the quadrature output signal comprises demodulating the quadrature output signal using a demodulating signal equivalent to the test signal.

16. The method of claim 14 wherein the test signal comprises a modulated signal.

17. The method of claim 14 wherein the step of applying the test signal comprises modulating a carrier in quadrature phase with respect to the phase of a carrier on a rate feedback signal that is fed back to the MEMS gyroscope.

18. The method of claim 14 wherein the step of generating the test signal comprises setting an amplitude of the test signal and wherein the step of detecting effects of the test signal in the quadrature output signal comprises determining a measure of an amplitude of the detected effects of the test signal.

19. The method of claim 18 wherein the step of generating the monitor output indicative of the operation of the sensing device based at least in part on the detected effects of the test signal comprises generating the monitor output based on the determined measure of the amplitude in detected effects of the test signal.

20. The method of claim 14 wherein the step of generating the monitor output indicative of the operation of the sensing device based at least in part on the detected effects of the test signal comprises comparing the detected effects of the test signal to a threshold value using a comparator and accumulating an output of the comparator.

\* \* \* \* \*